(12) United States Patent
Masaoka

(10) Patent No.: US 8,320,322 B2
(45) Date of Patent: Nov. 27, 2012

(54) ASSIGNMENT METHOD AND BASE STATION APPARATUS USING THE ASSIGNMENT METHOD

(75) Inventor: Nobuhiro Masaoka, Daito (JP)

(73) Assignee: Kyocera Corporation, Kyoto (JP)

( * ) Notice: Subject to any disclaimer, the term of this patent is extended or adjusted under 35 U.S.C. 154(b) by 583 days.

(21) Appl. No.: 12/521,560

(22) PCT Filed: Nov. 22, 2007

(86) PCT No.: PCT/JP2007/001293
§ 371 (c)(1),
(2), (4) Date: Aug. 17, 2009

(87) PCT Pub. No.: WO2008/081560
PCT Pub. Date: Jul. 10, 2008

(65) Prior Publication Data
US 2010/0316017 A1    Dec. 16, 2010

(30) Foreign Application Priority Data
Dec. 27, 2006    (JP) .................................. 2006-351873

(51) Int. Cl.
*H04W 4/00* (2009.01)
(52) U.S. Cl. .......................... 370/330; 375/259; 375/260
(58) Field of Classification Search .......... 370/203–211; 375/260
See application file for complete search history.

(56) References Cited

U.S. PATENT DOCUMENTS
2009/0022098 A1*  1/2009  Novak et al. ................... 370/329

FOREIGN PATENT DOCUMENTS

| | | |
|---|---|---|
| JP | 08-186533 | 7/1996 |
| JP | 2001-238269 | 8/2001 |
| JP | 2005-057684 | 3/2005 |
| JP | 2005-117579 | 4/2005 |
| JP | 2006-054597 | 2/2006 |
| JP | 2006-319940 | 11/2006 |
| JP | 2006-352786 | 12/2006 |
| WO | WO-2005/020488 | 3/2005 |

OTHER PUBLICATIONS

Office Action from Japanese Patent Application No. 2006-351873, mailed on Mar. 29, 2011.
Office Action from Japanese Patent Application No. 2006-351873, mailed on Jun. 15, 2010.
International Preliminary Report on Patentability for PCT/JP2007/001293, mailed on Jul. 9, 2009, 10 pages.
International Search Report for PCT/JP2007/001293, mailed on Jan. 22, 2008, 5 pages.

* cited by examiner

*Primary Examiner* — Charles C Jiang
(74) *Attorney, Agent, or Firm* — Duane Morris LLP; Richard C. Kim

(57) ABSTRACT

A control unit assigns time slots to terminal apparatuses, at regular intervals, over predetermined sub-channels among a plurality of sub-channels where the time slot is formed by frequency-multiplexing a plurality of sub-channels and frames each of which is formed by a plurality of time slots are contiguous. The control unit also arbitrarily assigns a plurality of time slots to terminal apparatuses, respectively, over the remaining sub-channels. An RF unit through an IF unit communicate with the terminal apparatuses assigned by the control unit.

5 Claims, 14 Drawing Sheets

| MESSAGE IDENTIFIER |
| # OF MULTIUSERS |
| SCHEDULING PERIOD |

FIG.6B

| MESSAGE IDENTIFIER |
| SERVICE FLOW IDENTIFIER |
| TIME SLOT MAP |

FIG.6C

| #1 | #2 | #3 | #4 | #5 | #6 | #7 | #8 | #9 | #10 | #11 | #12 | ... | #320 |
|---|---|---|---|---|---|---|---|---|---|---|---|---|---|
| 0 | 0 | 1 | 0 | 0 | 0 | 0 | 0 | 0 | 0 | 0 | 0 | | 0 |

.# ASSIGNMENT METHOD AND BASE STATION APPARATUS USING THE ASSIGNMENT METHOD

CROSS REFERENCE TO RELATED APPLICATIONS

This application is a U.S. National Phase Application of International Application PCT/JP2007/001293 filed Nov. 22, 2007 which claims priority to Japanese Patent Application No. 2006-351873 filed Dec. 27, 2006, the disclosures of which are incorporated herein by reference in their entirety.

TECHNICAL FIELD

The present invention relates to an assignment technique, and it particularly relates to a method for assigning time slots to terminal apparatuses, and a base station using the assignment method.

BACKGROUND TECHNOLOGY

In a radio communication system, there are cases where a base station apparatus connects to a plurality of terminal apparatuses. One such a mode of communication where the base station apparatus accesses a plurality of terminal apparatuses is TDMA/TDD. In TDMA/TDD, a frame is constituted by a plurality of time slots, and a plurality of time slots are assigned contiguously. Part of a plurality of time slots contained in each frame is used for uplink, whereas the remaining time slots are used for downlink. In a conventional technology using TDMA/TDD as mentioned above, the number of time slots used for uplink and those used for downlink in each frame are set according to a difference in the traffics (See Patent Document 1, for instance).
[Patent Document 1] Japanese Patent Application Laid-Open No. Hei08-186533.

DISCLOSURE OF THE INVENTION

Problems to be Solved by the Invention

In wireless communications, it is generally desired that the limited frequency resources be used effectively. With a growing communication rate in particular, such a demand is ever increasing. One of technologies that meet this request is a technique called OFDMA (Orthogonal Frequency Division Multiple Access). This scheme may be combined with the aforementioned TDMA/TDD. OFDMA is a technique where a plurality of terminal apparatuses are frequency-multiplexed using the OFDM scheme.

In OFDMA as mentioned above, scheduling processing for allocating subcarriers to a plurality of terminal apparatuses is carried out. In general, there are various types of data communicated in a plurality of terminal apparatuses, respectively, and the required communication rate and delay time differ according to the type of data. Under such circumstances, if the scheduling processing is performed based on the same rule on every terminal apparatus, some of the terminal apparatuses may not meet the requirement and unnecessary assignments may be made.

The present invention has been made in view of such circumstances and a purpose thereof is to provide a scheduling technique by which to perform efficient assignment.

Means for Solving the Problems

In order to resolve the above problems, a base station apparatus according to one embodiment of the present invention comprises: a first assignment unit which assigns a time slot to a terminal apparatus, at regular intervals, over a predetermined sub-channel among a plurality of sub-channels wherein the time slot is formed by frequency-multiplexing a plurality of sub-channels and frames each of which is formed by a plurality of time slots are contiguous; a second assignment unit which arbitrarily assigns the plurality of time slots to terminal apparatuses, respectively, over sub-channels other than the sub-channel to be assigned by the first assignment unit; and a communication unit which communicates with the terminal apparatuses assigned by the first assignment unit and the second assignment unit.

According to this embodiment, a periodic assignment is performed over a predetermined sub-channel among a plurality of sub-channels and, at the same time, an arbitrary assignment is performed over the remaining sub-channels. Thus the time slots can be efficiently assigned to the terminal apparatuses having various requests.

The second assignment unit may perform arbitrary assignment by a plurality of frames as one unit, and the communication unit may transmit first information on the sub-channels to be assigned by the second assignment unit and transmit second information on time slots assigned within one unit to the terminal apparatuses to be assigned by the second assignment unit. In such a case, the information common to a plurality of terminal apparatuses and the information for each of a plurality of terminal apparatuses are transmitted separately, so that information can be transmitted efficiently.

When the assignment of time slots to a predetermined terminal apparatus within one unit is identical over a contiguous sequence of units, the transmission of the second information is stopped and information indicating that the assignment thereof is identical is contained in the first information. In this case, the transmission of the second information is stopped when the assigned time slots are identical, so that the transmission efficiency can be improved.

Another embodiment of the present invention relates to an assignment method. This method is such that a time slot is assigned to a terminal apparatus, at regular intervals, over a predetermined sub-channel among a plurality of sub-channels where the time slot is formed by frequency-multiplexing a plurality of sub-channels and frames each of which is formed by a plurality of time slots are contiguous, and the plurality of time slots are arbitrarily assigned to terminal apparatuses, respectively, over other sub-channels.

Arbitrary assignment is performed using a plurality of frames as one unit, and not only first information on the sub-channels to be arbitrarily assigned but also second information on time slots assigned within one unit may be transmitted to the terminal apparatuses to be assigned arbitrarily. When the arbitrary assignment of time slots to a predetermined terminal apparatus within one unit is identical over a contiguous sequence of units, the transmission of the second information may be stopped and information indicating that the assignment thereof is identical may be contained in the first information.

Optional combinations of the aforementioned constituting elements, and implementations of the invention in the form of methods, apparatuses, systems, recording mediums, computer programs and so forth may also be effective as additional modes of the present invention.

Advantage of the Invention

The present invention realizes efficient assignment.

BRIEF DESCRIPTION OF THE DRAWINGS

FIG. 2(c) shows an exemplary structure of a sub-channel, as shown in FIG. 2(b), according to an embodiment of the present invention.

FIGS. 6(a) to 6(c) each shows a format of signal transmitted when scheduling assignment is performed in the communication system of FIG. 1;

DESCRIPTION OF THE REFERENCE NUMERALS

Figure 1:
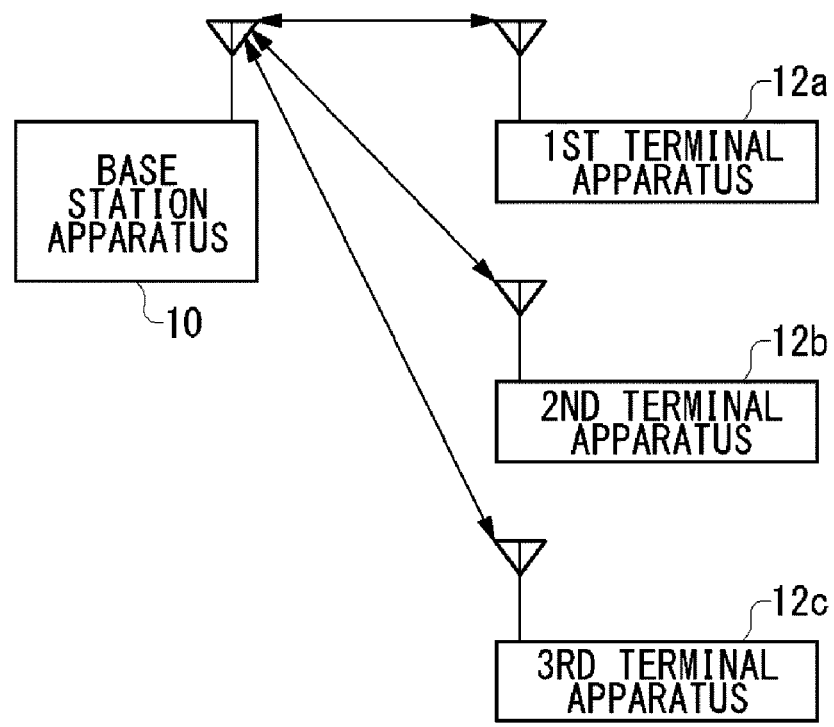
FIG. 1 shows a structure of a communication system according to an exemplary embodiment of the present invention.

10 Base station apparatus, 12 Terminal apparatus, 20 RF unit, 22 Modem unit, 24 Baseband processing unit, 26 IF unit, 30 Control unit, 100 Communication system.

BEST MODE FOR CARRYING OUT THE INVENTION

An outline of the present invention will be given before a specific description thereof. Exemplary embodiments of the present invention relate to a communication system comprised of a base station apparatus and at least one terminal apparatus. In the communication system, each frame is formed when a plurality of time slots are time-division multiplexed. And each time slot is formed when a plurality of sub-channels are frequency-division multiplexed. Each sub-channel is formed by multicarrier signals. Here, OFDM signals are used as the multicarrier signals whereas OFDMA is used as the frequency-division multiplexing.

The base station apparatus communicates with a plurality of terminal apparatuses by assigning a plurality of sub-channels contained in each time slot to the terminal apparatuses, respectively. Note here that there are a plurality of kinds of data to be communicated with a plurality of terminal apparatuses. The required communicating rate and delay time differ according to the type of data. For example, the audio communication generally requires a shorter delay time as compared with the data communication. Also, in the data communication, the communication rate varies depending on the contents of data. If sub-channels and time slots are assigned, to the terminal apparatuses having different requirements as described above, based on the same rule, the efficiency of allocation will deteriorate.

When the shorter delay time is required, it is preferable that sub-channels and time slots be assigned at regular intervals. However, if the similar assignment as this is performed on terminal apparatuses that do not require the shorter delay time, unnecessary assignments will be made. On the other hand, it is preferable that the sub-channels and time slots are assigned in a round-robin scheme in order to perform impartial and fair communication with a plurality of terminal apparatuses. However, as the number of terminal apparatuses increases, the delay time gets longer and there will be terminal apparatuses that do not meet the requirement for the delay time. The base station apparatus according to the present exemplary embodiments performs the following processing to efficiently assign the sub-channels and time slots to the terminal apparatuses having various types of requirements.

The base station separately performs an assignment rule in part of a plurality of sub-channels (the assignment corresponding to this rule will be hereinafter referred to as "periodic assignment") and an assignment rule in the remaining of the plurality of sub-channels (the assignment corresponding to this rule will be hereinafter referred to as "scheduling assignment"). The periodic assignment meant that the base station apparatus periodically assigns time slots to each terminal apparatus in a frame period, for instance. The scheduling assignment meant that the base station apparatus arbitrarily assigns time slots to each terminal apparatus. The base station apparatus assigns sub-channels with which to execute the periodic assignment to the terminal apparatuses that require the shorter delay time, and assigns sub-channels with which to execute the scheduling assignment to the terminal apparatuses that do not require the short delay time and requires various communication rates.

FIG. 1 shows a structure of a communication system 100 according to an exemplary embodiment of the present invention. The communication system 100 includes a base station apparatus 10, and a first terminal apparatus 12a, a second terminal apparatus 12b, and a third terminal apparatus 12, which are generically referred to as "terminal apparatus 12".

One end of the base station apparatus 10 connects to the terminal apparatus 12 via a radio network, whereas the other end thereof connects to a not-shown wired network. Also, the terminal apparatus 12 connects to the base station apparatus 10 via the radio network. The base station apparatus 10 communicates with a plurality of terminal apparatuses 12 by allocating communication channels thereto. Specifically, the terminal apparatus 12 transmits to the base station apparatus 10 a request signal requesting a channel allocation; in response to the received request signal, the base station apparatus 10 allocates a communication channel to the terminal apparatus 12. Here, as described above, there are two kinds of assignment rules in the communication system 100. The assignment rules are called a periodic assignment and a scheduling assignment. Though the detail thereof is discussed later, the base station apparatus 10 performs the periodic assignment and at the same time performs the scheduling assignment as well.

Also, the base station apparatus 10 transmits information on the communication channel allocated to the terminal apparatus 12, and the terminal apparatus 12 executes communication with the base station apparatus 10 using the allocated communication channel. As a result, the data transmitted from the terminal apparatus 12 are outputted to the wired network via the base station apparatus 10 and are finally received by a not-shown communication apparatus connected to the wired network. The data are also transmitted toward the terminal apparatus 12 from the communication apparatus. At regular intervals, the base station apparatus 10 conveys to the terminal apparatus 12 which performs the scheduling assignment, that the base station apparatus 10 is performing the scheduling assignment, and also conveys at regular intervals the communication channel assigned to said terminal apparatus 12. Its detail will be discussed later.

In the above description, a communication channel is identified by a combination of the aforementioned sub-channel and the time slot. Since the base station apparatus 10 has a plurality of time slots and a plurality of sub-channels, TDMA are performed using a plurality of time slots and at the same time performs OFDMA using a plurality of sub-channels.

Figure 2A:
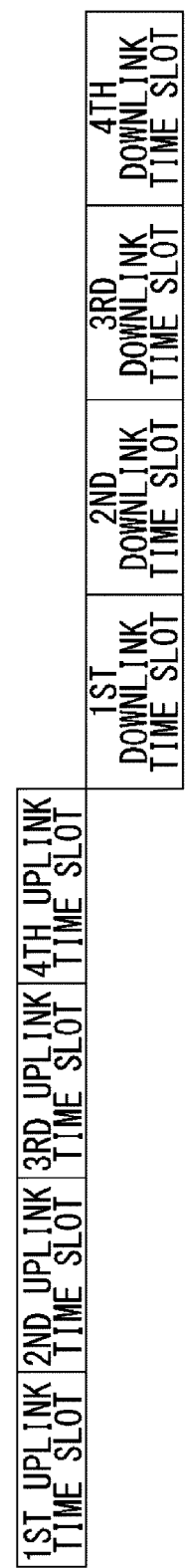
FIG. 2(a) shows a structure of a frame in the communication system of FIG. 1.
Figure 2B:
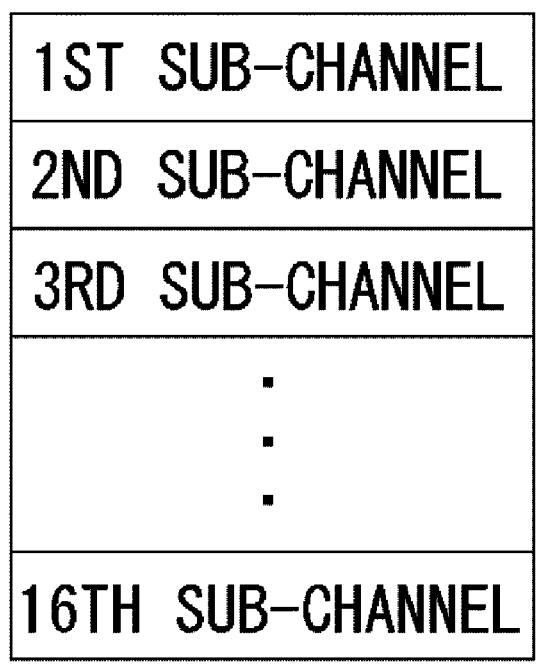
FIG. 2(b) shows an exemplary structure of a time slot, as shown in FIG. 2(a), according to an embodiment of the present invention.
Figure 2C:
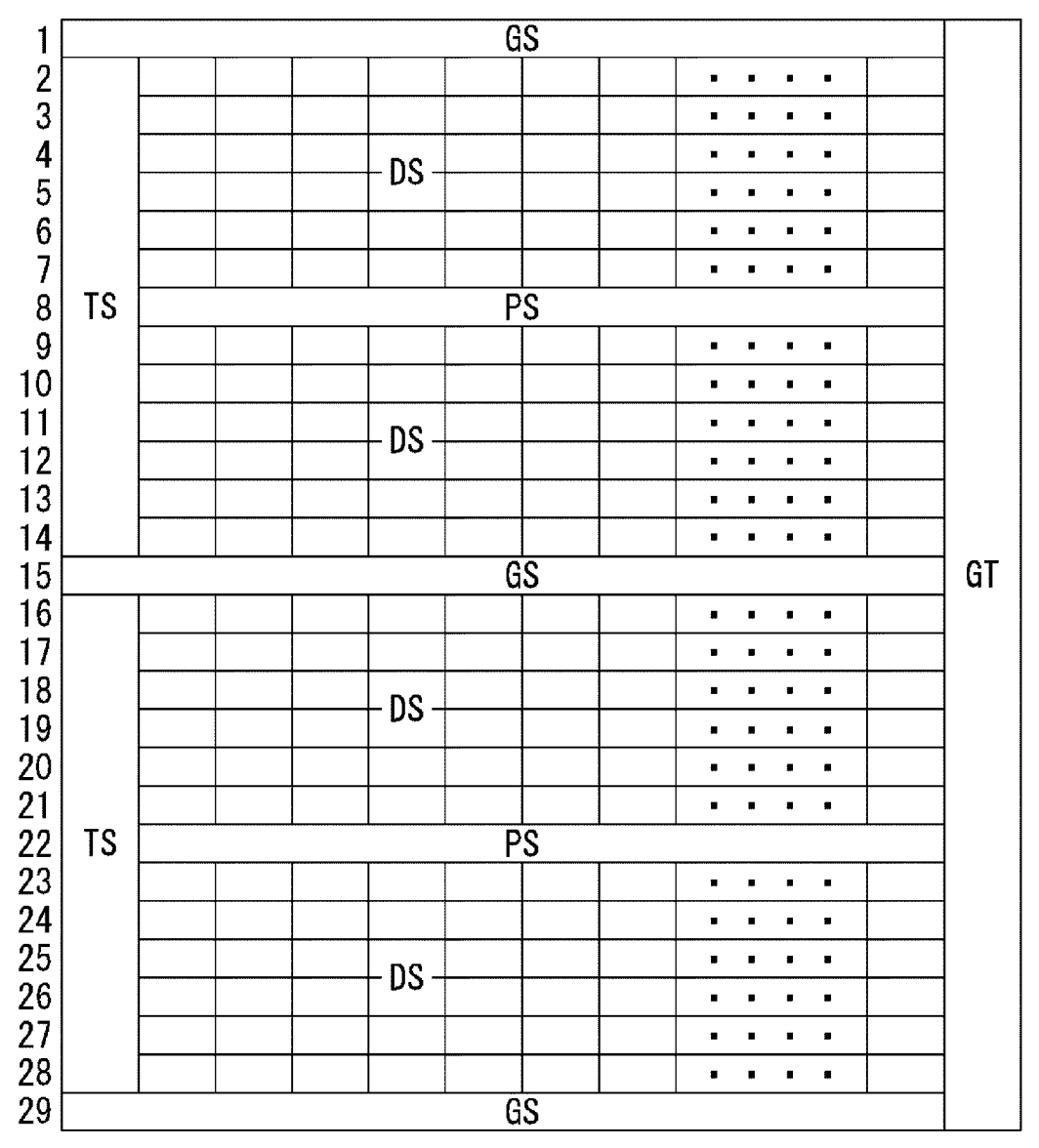

FIGS. 2(a) to 2(c) each shows a structure of a frame in the communication system 100. The horizontal direction in each of FIGS. 2(a) to 2(c) corresponds to time. A frame is constituted by eight time slots. The eight time slots are composed of four downlink time slots and four uplink time slots. Here, the four uplink time slots are denoted as "first uplink time slot" through "fourth uplink time slot", whereas the four downlink time slots are denoted as "first downlink time slot" through "fourth downlink time slot". The frame as shown in FIG. 2A is repeated contiguously. Note that the structure of a frame is not limited to that of FIG. 2(a) and, for the clarity of explanation, a description will be given hereinbelow of the structure of a frame assuming that the frame is constituted as shown in FIG. 2(a). For the simplicity of explanation, a description may be given of the uplink time slots only or the downlink time slots only, but the same description will be valid for the other time slots.

FIG. 2(b) shows a structure of one of the time slots shown in FIG. 2(a). The vertical direction of FIG. 2(b) corresponds to the frequency axis. As shown in FIG. 2(b), each time slot is formed by "16" sub-channels of "first sub-channel" through "sixteenth sub-channel". Such a plurality of sub-channels as these are frequency-division multiplexed. Since each time slot is constituted as shown in FIG. 2(b), the aforementioned communication channel is identified by the combination of the time slot and the sub-channel. Also, a frame construction corresponding to one of the sub-channels shown in FIG. 2(b) may be one shown in FIG. 2(a).

FIG. 2(c) shows a structure of one of the sub-channels shown in FIG. 2(b). Similar to FIGS. 2(a) and 2(b), the horizontal direction thereof corresponds to the time axis, whereas the vertical direction thereof corresponds to the frequency axis. The numbers "1" to "29" are given along the frequency axis. These numbers indicate subcarrier numbers. In this manner, a sub-channel is constituted by multicarrier signals, in particular, OFDM signal. "TS" in FIG. 2(c) corresponds to a training symbol, which is constituted by a known value. Assume that a control signal may be contained in "TS". "GS" corresponds to a guard symbol and no substantial signal is assigned here. "PS" corresponds to a pilot symbol, which is constituted by a known value. "DS" corresponds to a data symbol, which is data to be transmitted. "GT" corresponds o a guard time and no substantial signal is assigned here.

Figure 3:
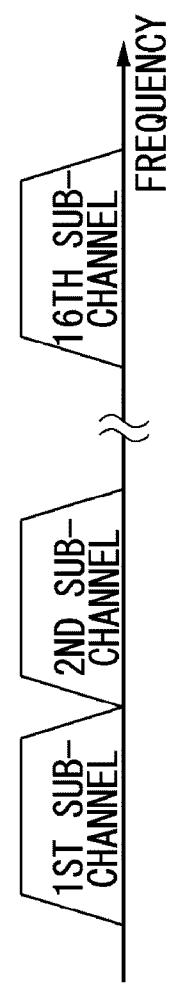
FIG. 3 shows an assignment of sub-channels in the communication system of FIG. 1.

FIG. 3 shows an assignment of sub-channels in the communication system 100. In FIG. 3, the horizontal axis represents the frequency axis and illustrates the spectrum for time slots shown in FIG. 2(b). As described above, sixteen sub-channels composed of the first sub-channel to the sixteenth sub-channel are frequency-division multiplexed in each time slot. Each sub-channel is constituted by multicarrier signals, namely, OFDM signal here.

Figure 4:
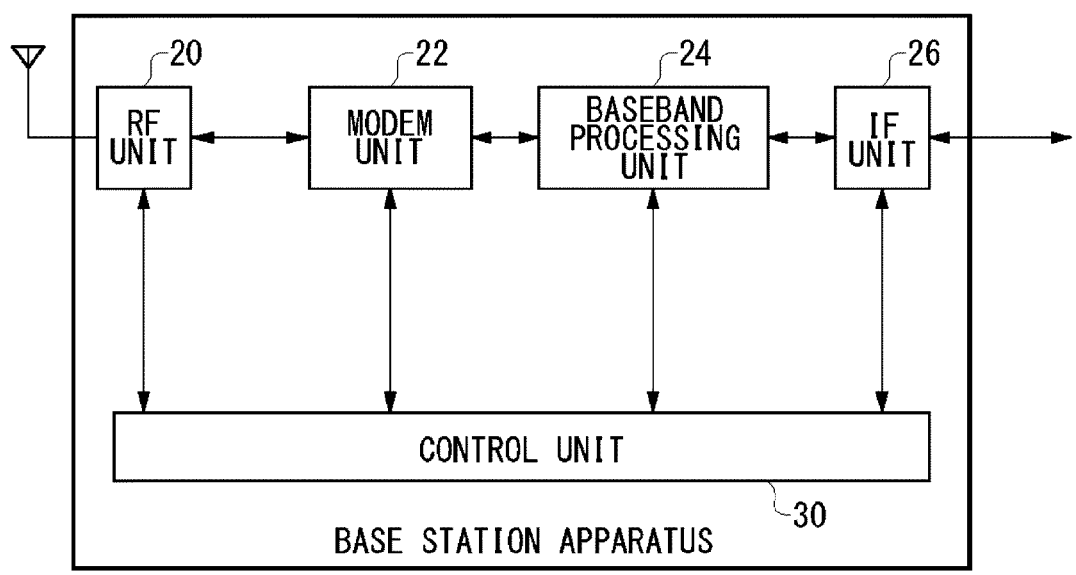
FIG. 4 shows a structure of a base station apparatus shown in FIG. 1.

FIG. 4 shows a structure of the base station apparatus 10. The base station apparatus 10 includes an RF unit 20, a modem unit 22, a baseband processing unit 24, an IF unit 26, and a control unit 30.

As a receiving processing, the RF unit 20 performs frequency conversion on radiofrequency multicarrier signals received from a not-shown terminal apparatus 12 so as to produce baseband multicarrier signals. Here, the multicarrier signal is formed as shown in FIG. 3 and corresponds to an uplink time slot as shown in FIG. 2(a). Further, the RF unit 20 outputs the baseband multicarrier signal to the modem unit 22. The baseband multicarrier signal, which is composed of in-phase components and quadrature components, shall generally be transmitted by two signal lines. For the clarity of Figures, the baseband multicarrier signal is presented here by a single signal line only. An AGC unit and an A-D conversion unit are also included in the RF unit 20.

As a transmission processing, the RF unit 20 performs frequency conversion on the baseband multicarrier signals inputted from the modem unit 22 and thereby produces radiofrequency multicarrier signals. Further, the RF unit 20 transmits the radiofrequency multicarrier signals. The RF unit 20 transmits the multicarrier signals using the same radio-frequency band as that of the received multicarrier signals. That is, assume that TDD (Time Division Duplex) is in use as shown in FIG. 2(a). A PA (Power Amplifier) and a D-A conversion unit are also included in the RF unit 20.

As a receiving processing, the modem unit 22 converts a time domain into a frequency domain by performing FFT on the baseband multicarrier signals inputted from the RF unit 20. The multicarrier signals converted into the frequency domain have components corresponding respectively to a plurality of subcarriers as shown in FIGS. 2(b) and 2(c). The modem unit 22 sets timing synchronization, namely FFT windows, and also removes the guard intervals. A known technique may be used for the timing synchronization or the like and therefore the description thereof is omitted here. Also, the modem unit 22 demodulates the multicarrier signals which have been converted into the frequency domain. Though channel characteristics are estimated for the demodulation, the channel characteristics are estimated on a subcarrier-by-subcarrier basis. The modem unit 22 outputs the results of the demodulation to the baseband processing unit 24

As a transmission processing, the modem unit 22 modulates the multicarrier signals received from the baseband processing unit 24. Also, the modem unit 22 converts a frequency domain into a time domain by performing IFFT on the modulated multicarrier signals. The modem unit 22 outputs the multicarrier signals which have been converted to the time domain, to the RF unit 20 as baseband multicarrier signals. Though the modem unit 22 also appends guard intervals, the description thereof is omitted here.

As a receiving processing, the baseband processing unit 24 receives the results of the demodulation from the modem unit 22 and separates the demodulation results for each of the terminal apparatuses 12. That is, the demodulation results are composed of a plurality of sub-channels as shown in FIG. 3. Accordingly, if each sub-channel is assigned to each terminal apparatus 12, the demodulation results will contain signals sent from a plurality of terminal apparatuses. The baseband processing unit 24 separates such demodulation results for each of the terminal apparatuses 12. The baseband processing unit 24 appends information used to identify an originating terminal apparatus 12 and information used to identify the destination thereof to the demodulation results, and outputs them to the IF unit 26.

As a transmission processing, the baseband processing unit 24 receives, from the IF unit 26, data to be sent to a plurality of terminal apparatuses 12, and then assigns the data to sub-channels so as to form multicarrier signals from a plurality of sub-channels. That is, the baseband processing unit 24 forms multicarrier signals composed of a plurality of sub-channels, as shown in FIG. 3. Note that a sub-channel to which data are to be assigned is determined beforehand as in FIG. 2(c) and an instruction on this predetermined sub-channel is received from the control unit 30. The baseband processing unit 24 outputs the multicarrier signals to the modem unit 22.

As a receiving processing, the IF unit 26 outputs the demodulation results received from the baseband processing unit 24, to the not-shown wired network. The destination of the demodulation results, which is information appended to the demodulation results, is set based on information used to identify the destination. Here, the information used to identify the destination is indicated by IP (Internet Protocol) addresses, for instance. As a transmission processing, the IF unit 26 receives the input of data for a plurality of terminal apparatuses 12 via the not-shown wired network. The control unit 30 outputs the inputted data to the baseband processing unit 24.

The control unit 30 allocates communication channels to the terminal apparatuses 12, controls the timing of the entirety of the base station apparatus 10, and so forth. Allocating the communication channels is equivalent to assigning the combination of sub-channels and time slots. The control unit 30 performs the periodic assignment and the scheduling assignment as an allotment of communication channels. In particular, the control unit 30 associates, in advance, the periodic assignment or scheduling assignment with each sub-channel. The control unit 30 performs the periodic assignment over predetermined sub-channels among a plurality of sub-channels. That is, time slots are periodically assigned to the terminal apparatuses 12 over the predetermined sub-channels.

For example, the "third uplink time slot" and the "third downlink time slot", namely the time slots within a frame period, are assigned to the first terminal apparatus 12a. Note that the assignment of time slots is preferably made at regular intervals and may be made not only in a frame period but also in a longer period than the frame period or in a shorter period than the frame period. Though the predetermined sub-channels may be dynamically selected according to the traffic, assume herein, for the clarity of explanation, that the predetermined channels are selected beforehand in a prefixed manner. For example, the control unit 30 performs the periodic assignment over the even-numbered sub-channels.

Also, the control unit 30 performs the scheduling assignment over sub-channels other than the sub-channels which are to be subjected to the periodic assignment. That is, the terminal apparatuses 12 are arbitrarily assigned respectively to a plurality of time slots over these sub-channels. For example, the control unit 30 assigns time slots, in a round-robin format, to a plurality of terminal apparatuses to be assigned to these sub-channels. The control unit 30 may determine the allotment of the time slots by reflecting the communications traffic between the base station apparatus 10 and the terminal apparatuses 12.

Here, the control unit 30 performs the scheduling assignment in a manner such that a plurality of frames are regarded as a single unit (hereinafter this unit will be referred to as "unit period"). "40" frames are defined as one unit. The control unit 30 determines the assignment of each of "320" time slots contained in "40" frames to the terminal apparatuses 12. After a predetermined time period elapses, the control unit 30 determines the assignment of the next "40" frames to the terminal apparatuses 12. The control unit 30 conveys the result of the assignment to the terminal apparatus 12. The signal format and the like used then will be described later. For the simplicity of explanation hereinbelow, a sub-channel to be subjected to the periodic assignment will be called "periodic sub-channel", whereas a sub-channel subjected to the scheduling assignment will be called "scheduling sub-channel".

The control unit 30 receives and transmits control signals between the base station apparatus 10 and not-shown terminal apparatuses 12, via the RF unit 20 through the IF unit 26. There are a plurality of kinds of control signals. Particularly, those relevant to the present exemplary embodiment are described as follows: (1) control signal at the time of a new connection, (2) control signal at the time of scheduling assignment execution, and (3) control signal at the time of channel switching.

(1) Control Signal at the Time of a New Connection

The control unit 30 receives a radio source acquisition request Signaling Control Channel (SCCH) from a not-shown terminal apparatus 12 which is not connected, via the RF unit 20 through the IF unit 26. Based on the radio resource acquisition request SCCH, the control unit 30 allocates a communication channel to this terminal apparatus 12. In so doing, the control unit 30 determines the assignment of periodic sub-channels or the assignment of scheduling sub-channels, based on information, contained in the radio resource acquisition request SCCH, indicating whether the periodic assignment is desired or the scheduling assignment is desired. When the control unit 30 is to assign a periodic sub-channel to the terminal apparatus 12, the control unit 30 assigns, at regular intervals, time slots contained in said periodic sub-channel. On the other hand, when the control unit 30 is to assign a scheduling sub-channel to the terminal apparatus 12, the control unit 30 arbitrarily assigns time slots contained in said scheduling sub-channel.

Figure 5A:
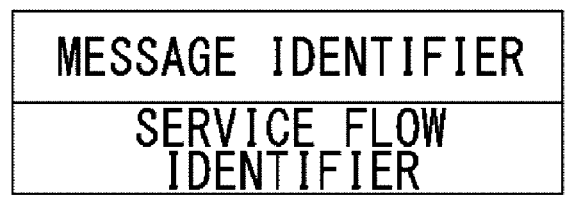
FIGS. 5(a) and 5(b) each shows a format of signal transmitted at the start of communications in the communication system of FIG. 1.
Figure 5B:
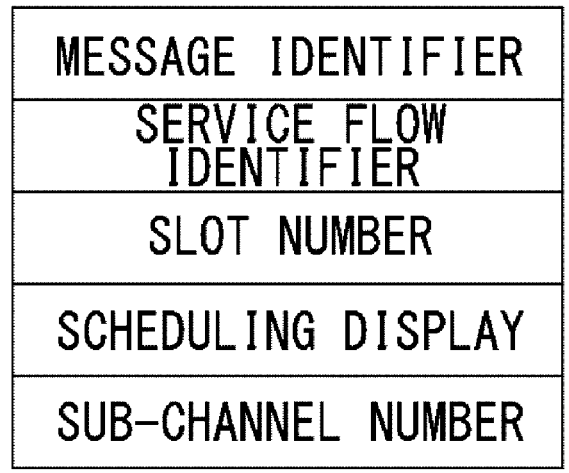

The control unit 30 transmits the aforementioned assignment result to the not-shown terminal apparatus 12 as a radio resource allotment SCCH from the IF unit 26 through the RF unit 20. The not-shown terminal apparatus 12 performs communications based on the contents of the received radio resource allotment SCCH. FIGS. 5(a) and 5(b) each shows a format of signal transmitted at the start of communications in the communication system 100. In the formats shown below, information on a sender or destination is omitted. FIG. 5(a) shows a format of radio resource acquisition request SCCH. An identification number associated with the SCCH is indicated in a "message identifier". An identification number associated with the radio resource acquisition request SCCH is indicated in a "service flow identifier". The identifier also indicates whether the periodic assignment is desired or the scheduling assignment is desired.

FIG. 5(b) shows a format of radio resource allotment SCCH. An identification number associated with the SCCH is indicated in a "message identifier". An identification number associated with the radio resource allotment SCCH is indicated in a "service flow identifier". A slot number assigned in the case of periodic assignment is indicated in a "slot number". On the other hand, in the case of scheduling assignment, the slot numbers used until the applicable unit period will end may be indicated or nothing may be indicated. Whether the scheduling assignment is being made or not may be indicated in a "scheduling display". A sub-channel number allocated is indicated in a "sub-channel number". Now, refer back to FIG. 4.

(2) Control Signal at the Time of Scheduling Assignment Execution

The control unit 30 broadcasts, per unit period, a scheduling information broadcast Broadcasting Channel in Scheduled Channel (SCHBCCH) on a sub-channel to terminal apparatuses 12 that share said scheduling sub-channel, via the IF unit 26 through the RF unit 20. The number of multiusers and the unit period are conveyed by the scheduling information broadcast SCHBCCH. Following the broadcasting of the scheduling information broadcast SCHBCCH, the control unit 30 transmits a scheduling time-slot notification Signaling Control Channel in Scheduled Channel (SCHSCCH) on time slots assigned within the unit period to each terminal apparatus 12.

Information on the scheduling-performed time slots is contained in the scheduling time-slot notification SCHSCCH in a bit map format. The scheduling-performed time slots are only valid during the unit period. The not-shown terminal apparatus 12 recognizes the unit period based on the scheduling information broadcast SCHBCCH, and recognizes the time slots to be used, based on the scheduling time-slot notification SCHSCCH.

FIGS. 6(*a*) to 6(*c*) each shows a format of signal transmitted when the scheduling assignment is performed in the communication system 100. FIG. 6(*a*) shows a format of scheduling information broadcast SCHBCCH. An identification number associated with the SCHBCCH is indicated in a "message identifier". The number of terminal apparatuses 12 that share said scheduling sub-channel is indicated in "the number of multiusers". The value of the unit period is indicated in a "scheduling period".

FIG. 6(*b*) shows a format of scheduling time-slot notification SCHSCCH. An identification number associated with the SCHSCCH is indicated in a "message identifier". An identification number associated with the scheduling time-slot notification SCHSCCH is indicated in a "service flow identifier". Information on the scheduling-performed time slots is indicated in a "time slot map" in a bit map format.

FIG. 6(*c*) shows a format of time slot map. As described above, the assignment of time slots in the unit period is indicated in the time slot map. Since the unit period is "40" frames long here, "320" time slots are contained in the unit period. The numbers "1" to "320" are given to such time slots, and they are indicated as "#1" to "#320" in FIG. 6(*c*). The assigned time slots are indicated by "1" and those otherwise are indicated by "0". Now, refer back to FIG. 4.

(3) Control Signal at the Time of Channel Switching

The control unit 30 measures the volume of communications traffic during communications performed between the base station apparatus 10 and not-shown terminal apparatuses 12. For example, the control unit 30 measures the traffic by monitoring the amount of data stored in a transmit buffer and a receive buffer. The control unit 30 switches between the allocation to the periodic sub-channels and the allocation to the scheduling sub-channels, according to the measured traffic. For example, if the traffic of a terminal apparatus 12 performing the assignment to the periodic sub-channels becomes smaller than a first threshold value, the control unit 30 will determine the assignment of the scheduling sub-channels to this terminal apparatus 12.

If, on the other hand, the traffic of a terminal apparatus 12 performing the assignment to the scheduling sub-channels becomes larger than a second threshold value, the control unit 30 will determine the assignment of the periodic sub-channels to this terminal apparatus 12. If a change is determined, the control unit 30 will transmit a TCH change instruction to this terminal apparatus 12 via the IF unit 26 through RF unit 20. If the terminal apparatus 12 has approved of the change, the control unit 30 will receive a TCH change response from the terminal apparatus 12 via the RF unit 20 through the IF unit 26. Then the control unit 30 effects the change.

Figure 7A:
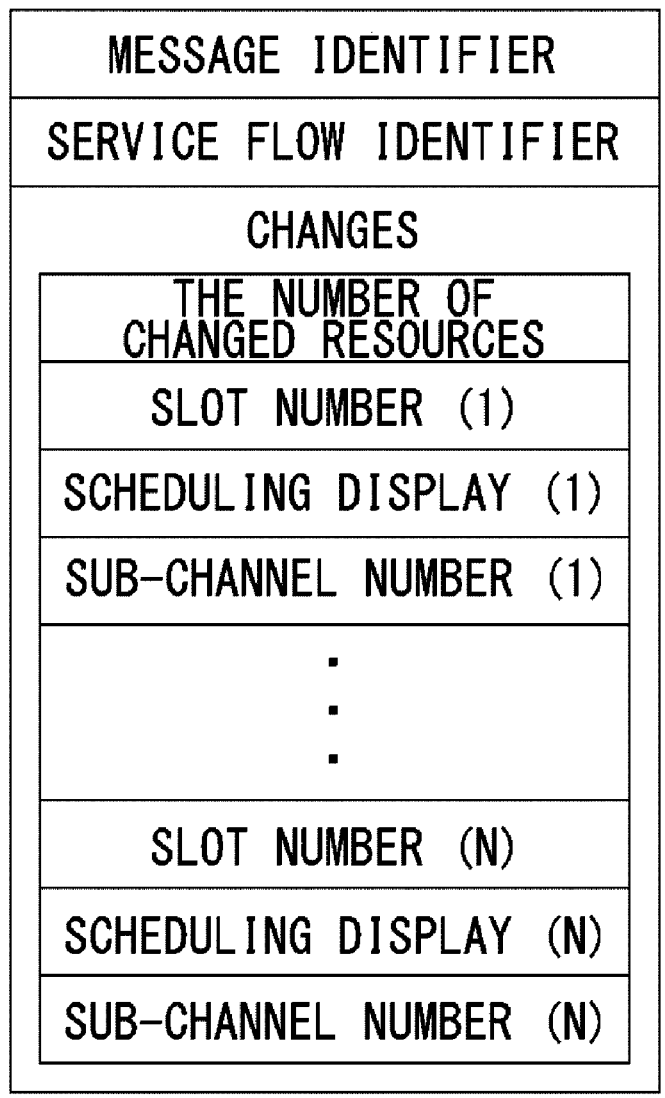
FIGS. 7(a) and 7(b) each shows a format of signal transmitted when TCH is changed in the communication system of FIG. 1.
Figure 7B:
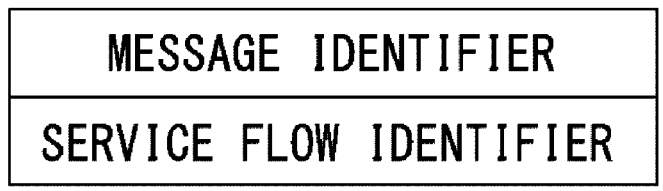

FIGS. 7(*a*) and 7(*b*) each shows a format of signal transmitted when TCH is changed in the communication system 100. FIG. 7(*a*) shows a format of TCH change instruction. The presence of a "message identifier" and a "service flow identifier" indicates that this is a TCH change instruction. A new assignment is indicated in "changes". The number of terminal apparatuses 12 to which changes are to be made is indicated in "the number of changed resources". A new assignment for such a first terminal apparatus 12 is indicated specifically in "slot number (1)", "scheduling display (1)", and "sub-channel number (1)".

A new assignment for such an Nth terminal apparatus 12 is indicated specifically in "slot number (N)", "scheduling display (N)", and "sub-channel number (N)". FIG. 7(*b*) shows a format of TCH change response. The presence of a "message identifier" and a "service flow identifier" indicates that this is a TCH change response. Now, refer back to FIG. 4. The RF unit 20 through the IF unit 26 communicate with the terminal apparatus 12 assigned by the control unit 30.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 8:
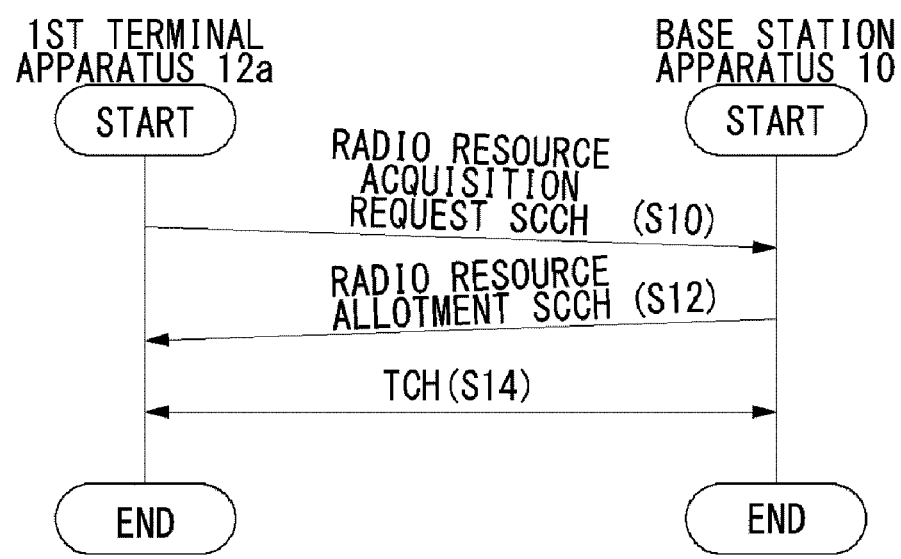
FIG. 8 is a sequence diagram showing a procedure for starting communications by the communication system of FIG. 1.

An operation of the communication system 100 structured as above is now described. FIG. 8 is a sequence diagram showing a procedure for starting communications by the communication system 100. The first terminal apparatus 12*a* transmits a radio resource acquisition request SCCH to the base station apparatus 10 (S10). The base station apparatus 10 assigns a communication channel to the first terminal apparatus 12*a* and then transmits a radio resource allotment SCCH to the first terminal apparatus 12*a* (S12). Then the first terminal apparatus 12*a* and the base station apparatus 10 communicate with each other using TCH (S14).

Figure 9:
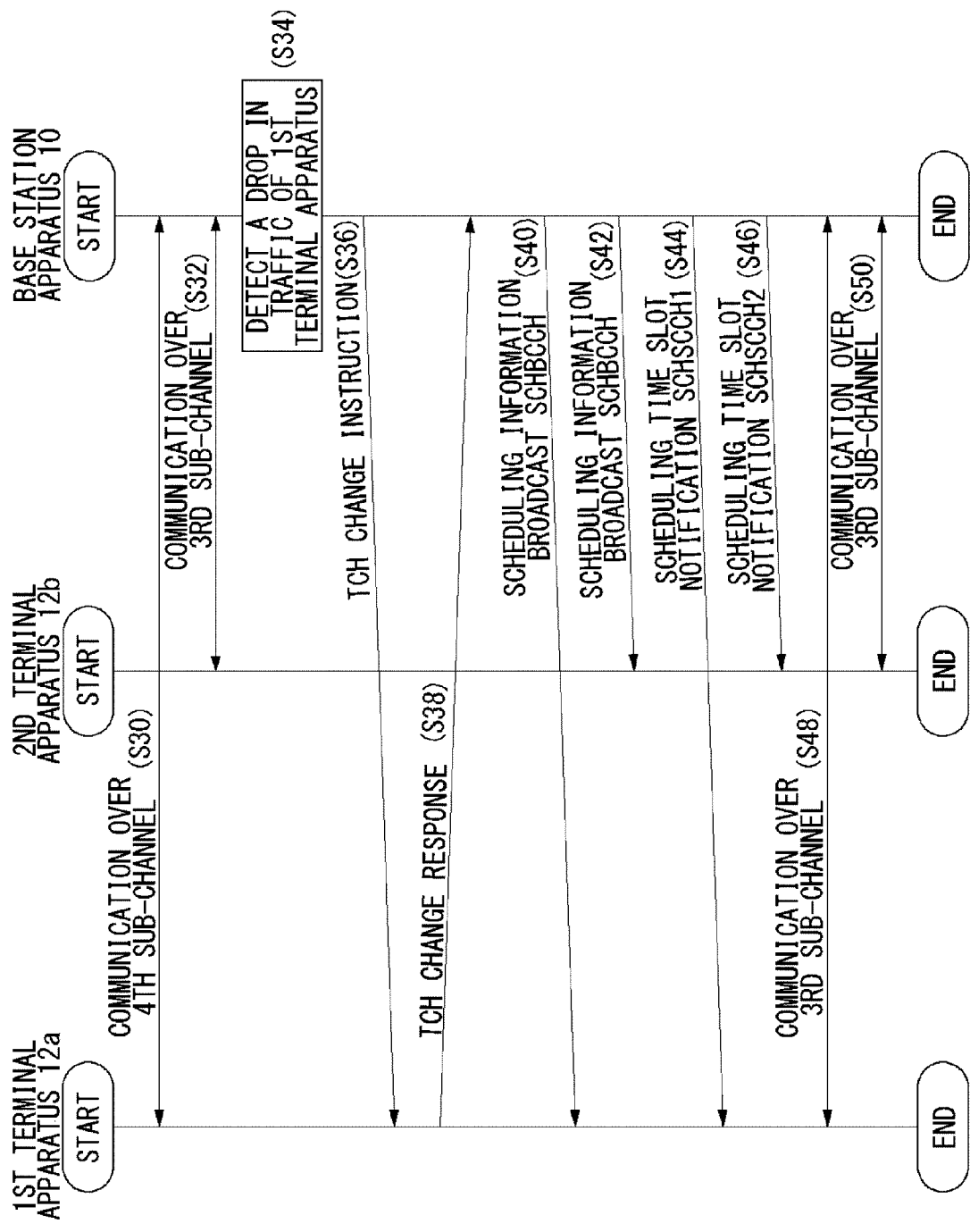
FIG. 9 is a sequence diagram showing a procedure for changing the allocation from a periodic assignment to a scheduling assignment by the communication system of FIG. 1.

FIG. 9 is a sequence diagram showing a procedure for changing the allocation from the periodic assignment to the scheduling assignment by the communication system 100. Assume herein that the fourth sub-channel corresponds to a periodic sub-channel and the third sub-channel corresponds to a scheduling sub-channel. The first terminal apparatus 12*a* and the base station apparatus 10 communicate with each other over the fourth sub-channel (S30). The second terminal apparatus 12*b* and the base station apparatus 10 communicate with each other over the third sub-channel (S32). The base station apparatus 10 detects a drop in traffic of the first terminal apparatus 12*a* (S34). The base station apparatus 10 transmits a TCH change instruction to the third sub-channel, to the first terminal apparatus 12a (S36). The first terminal apparatus 12a transmits a TCH change response, to the base station apparatus 10 (S38).

The base station apparatus 10 broadcasts a scheduling information broadcast SCHBCCH (S40, S42). For the simplicity of explanation, these steps are shown as two different steps but the scheduling information broadcast SCHBCCH is transmitted only once. The base station apparatus 10 transmits a scheduling time-slot notification SCHSCCH1 (S44) to the first terminal apparatus 12a and, at the same time, transmits a scheduling time-slot notification SCHSCCH2 (S46). Then the first terminal apparatus 12a and the base station apparatus 10 communicate with each other over the third sub-channel (S48), and the second terminal apparatus 12b and the base station apparatus 10 communicate with each other over the third sub-channel (S50).

Figure 10:
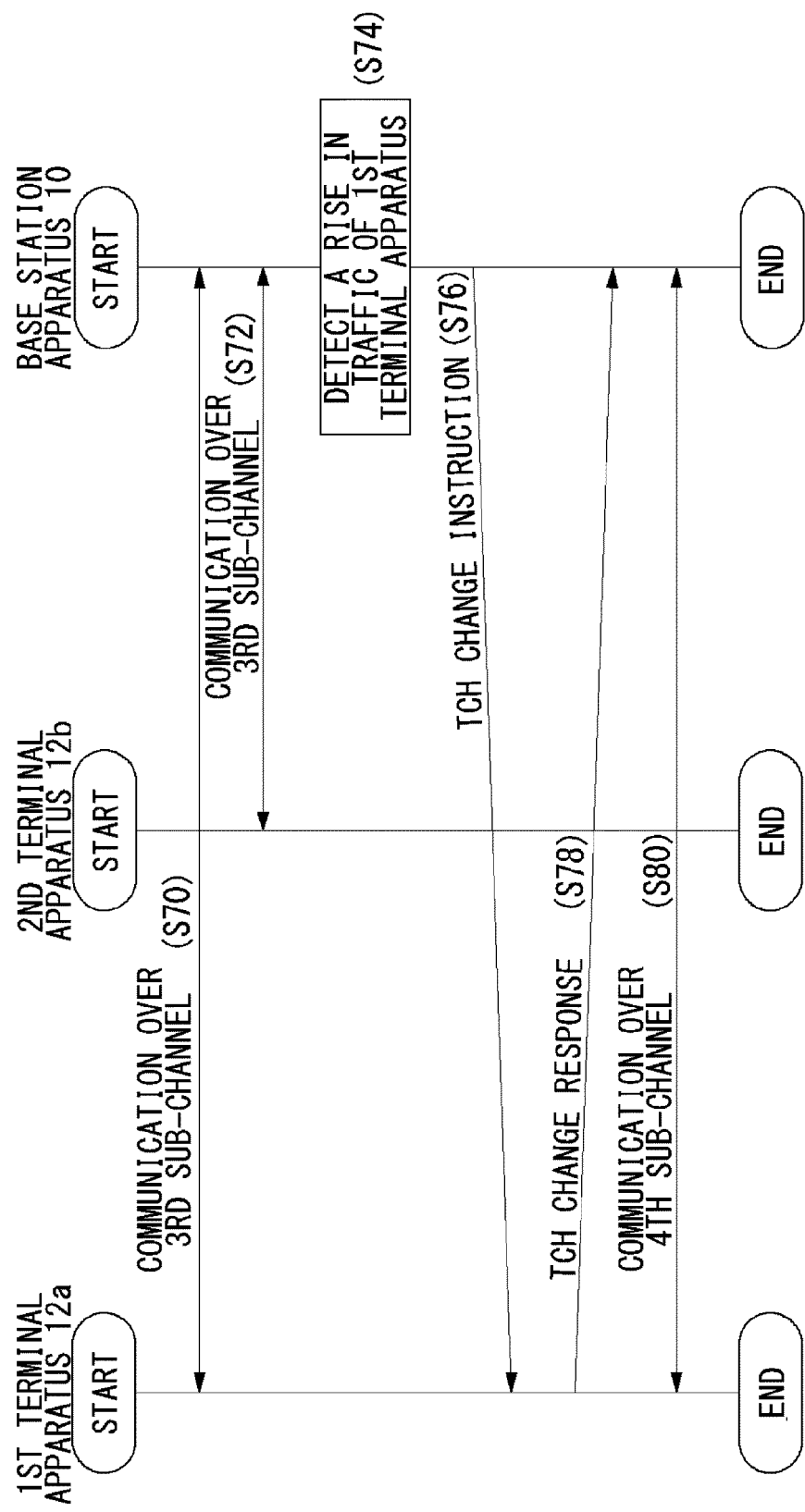
FIG. 10 is a sequence diagram showing a procedure for changing the allocation from a scheduling assignment to a periodic assignment by the communication system of FIG. 1.

FIG. 10 is a sequence diagram showing a procedure for changing the allocation from the scheduling assignment to the periodic assignment by the communication system 100. The first terminal apparatus 12a and the base station apparatus 10 communicate with each other over the third sub-channel (S70). The second terminal apparatus 12b and the base station apparatus 10 communicate with each other over the third sub-channel (S72). The base station apparatus 10 detects a rise in traffic of the first terminal apparatus 12a (S74). The base station apparatus 10 transmits a TCH change instruction to the fourth sub-channel, to the first terminal apparatus 12a (S76). The first terminal apparatus 12a transmits a TCH change response to the base station apparatus 10 (S78). Then the first terminal apparatus 12a and the base station apparatus 10 communicate with each other over the fourth sub-channel (S80).

Figure 11:
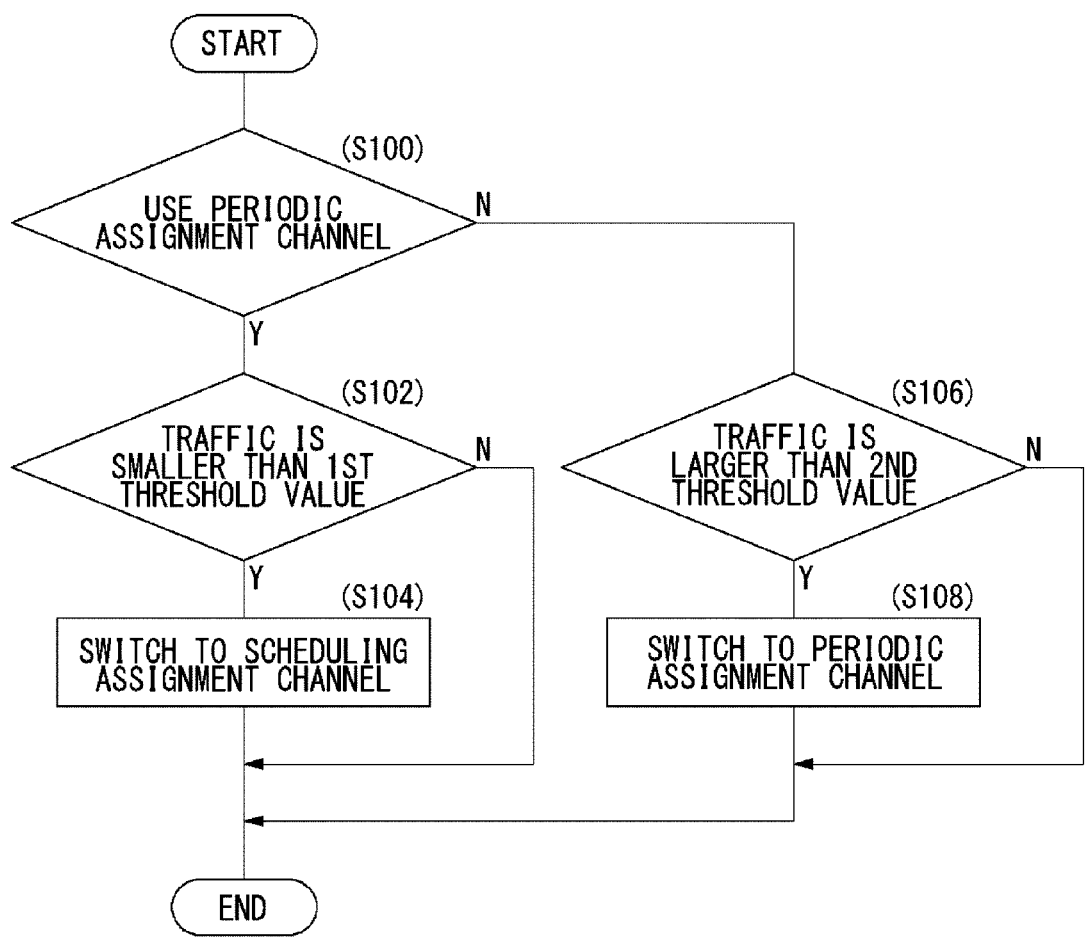
FIG. 11 is a flowchart showing a procedure for changing the allocation between a scheduling assignment and a periodic assignment by the base station apparatus of FIG. 4.

An operation of the base station apparatus structured as above is now described. FIG. 11 is a flowchart showing a procedure for changing the allocation between the scheduling assignment and the periodic assignment by the base station apparatus 10. If the terminal apparatus 12 uses a periodic assignment sub-channel (Y of S100) and the volume of communications traffic becomes smaller than the first threshold value (Y of S102), the control unit 30 will determine the switching to a scheduling assignment sub-channel (S104). If the traffic is not smaller than the first threshold value (N of S102), the control unit 30 will not determine the switching.

If, on the other hand, the terminal apparatus 12 does not use the periodic assignment sub-channel (N of S100), namely it uses a scheduling assignment sub-channel, and the traffic becomes larger than the second threshold value (Y of S106), the control unit 30 will determine the switching to a periodic assignment sub-channel (S108). If the traffic is not larger than the second threshold value (N of S106), the control unit 30 will not determine the switching. Then the processing will terminate.

Figure 12:
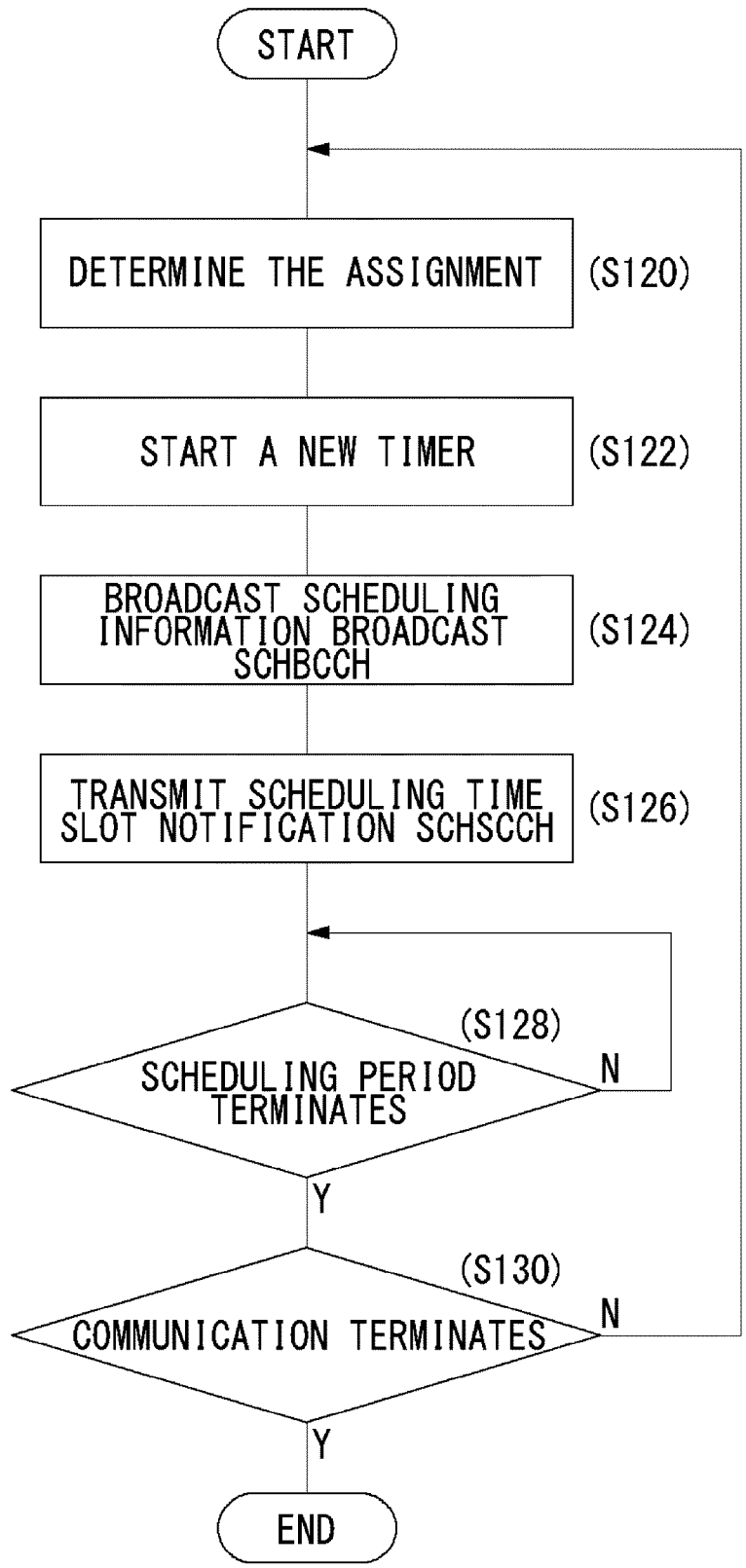
FIG. 12 is a flowchart showing a procedure for performing a scheduling assignment by the base station apparatus of FIG. 4.

FIG. 12 is a flowchart showing a procedure for performing the scheduling assignment by the base station apparatus 10. The control unit 30 determines the assignment of time slots (S120) and starts a new timer (S122). The RF unit 20 and so forth broadcast the scheduling information broadcast SCHBCCH (S124) and, at the same time, transmit the scheduling time-slot notification SCHSCCH (S126). If a schedule period does not terminate (N of S128), the control unit 30 will wait ready. If the schedule period has terminated (Y of S128) and the communication does not terminate (N of S130), return to Step 120. If the communication has terminated (Y of S130), the processing will terminate.

According to the exemplary embodiments of the present invention, the periodic assignment is performed using predetermined sub-channels among a plurality of sub-channels and, at the same time, the scheduling assignment is performed using the remaining sub-channels, so that efficient assignment can be performed on the terminal apparatuses having various kinds of requests. Also, the delay time can be shortened by the allocation to the periodic sub-channels, and adjustment according to the traffic can be easily made by the allocation to the scheduling sub-channels. Combining the periodic sub-channels with the scheduling sub-channels enables flexible assignment. Since the scheduling information broadcast SCHBCCH common to a plurality of terminal apparatuses and the scheduling time-slot notification SCHSCCH for each terminal apparatus are transmitted separately, information can be transmitted efficiently.

The present invention has been described based on the exemplary embodiments of the present invention. The exemplary embodiments are intended to be illustrative only, and it is understood by those skilled in the art that various modifications to constituting elements and processes could be developed and that such modifications are also within the scope of the present invention.

In the exemplary embodiments of the present invention, the base station apparatus 10 transmits the scheduling time-slot notification SCHSCCH per unit period. However, this should not be considered as limiting. For example, if the assignment of time slots within a unit period to the terminal apparatus 12, on which the scheduling assignment has been effected, is the same over the continuous unit periods, the transmission of the scheduling time-slot notification SCHSCCH may be stopped. In such a case, the base station apparatus 10 causes the scheduling information broadcast SCHBCCH to contain therein the information indicating that the assignment thereof is the same. According to this modification, the transmission of the scheduling time-slot notification SCHSCCH is stopped when the assigned time slots are identical, so that the information can be transmitted efficiently.

INDUSTRIAL APPLICABILITY

The present invention provides efficient assignments.

The invention claimed is:

1. A base station apparatus, comprising:
a first processor which assigns a time slot to a terminal apparatus, at regular intervals, over a predetermined sub-channel among a plurality of sub-channels wherein the time slot is frequency-multiplexed into a plurality of sub-channels, and one or more frames are respectively formed by a plurality of contiguous time slots;
a second processor which arbitrarily assigns the plurality of time slots to terminal apparatuses, respectively, over sub-channels other than the sub-channel to be assigned by said first processor; and
a transceiver which communicates with the terminal apparatuses assigned by said first processor and said second processor.

2. A base station apparatus according to claim 1, wherein said second processor performs arbitrary assignment of a plurality of frames as one unit, and
wherein said transceiver transmits first information on the sub-channels to be assigned by said second processor and transmits second information on time slots assigned within one unit to the terminal apparatuses to be assigned by said second processor.

3. A base station apparatus according to claim 2, wherein when the assignment of time slots to a predetermined terminal apparatus, by the second processor, within one unit is identical over a contiguous sequence of units, the transmission of the second information is stopped, and information indicating that the assignment is identical over the contiguous sequence of units included in the first information.

4. An assignment method, wherein a time slot is assigned to a terminal apparatus, at regular intervals, over a predetermined sub-channel among a plurality of sub-channels where the time slot is frequency-multiplexed into a plurality of sub-channels, and one or more frames are respectively formed by a plurality of contiguous time slots, and wherein the plurality of time slots are arbitrarily assigned to terminal apparatuses, respectively, over other sub-channels.

5. A non-transitory computer readable medium for use with a computer system, the computer readable medium storing instructions thereon, comprising:

assigning a time slot to a terminal apparatus, at regular intervals, over a predetermined sub-channel among a plurality of sub-channels wherein the time slot is frequency-multiplexed into a plurality of sub-channels, and one or more frames are respectively formed by a plurality of contiguous time slots;

assigning arbitrarily the plurality of time slots to terminal apparatuses, respectively, over other sub-channels; and communicating with the assigned terminal apparatuses via a radio network.

* * * * *